US010837590B2

United States Patent
Duke et al.

(10) Patent No.: US 10,837,590 B2
(45) Date of Patent: Nov. 17, 2020

(54) PIPELINE PIG RETRIEVAL APPARATUS

(71) Applicants: Marvin Duke, Lampman (CA); Terry Duke, Lampman (CA)

(72) Inventors: Marvin Duke, Lampman (CA); Terry Duke, Lampman (CA)

(*) Notice: Subject to any disclaimer, the term of this patent is extended or adjusted under 35 U.S.C. 154(b) by 0 days.

(21) Appl. No.: 16/431,395

(22) Filed: Jun. 4, 2019

(65) Prior Publication Data

US 2019/0368648 A1    Dec. 5, 2019

(30) Foreign Application Priority Data

Jun. 4, 2018 (CA) ........................ 3007140

(51) Int. Cl.
   *F16L 55/46*    (2006.01)
   *B08B 9/055*    (2006.01)
   *B08B 13/00*    (2006.01)

(52) U.S. Cl.
   CPC .............. *F16L 55/46* (2013.01); *B08B 9/055* (2013.01); *B08B 13/00* (2013.01)

(58) Field of Classification Search
   CPC .......... F16L 55/46; B08B 9/055; B08B 13/00; E21B 21/01; E21B 21/06; B07B 1/04; B07B 1/12; B07B 2230/01
   USPC ....... 15/3.51, 104.062, 257.01; 137/242.244, 137/268
   See application file for complete search history.

(56) References Cited

U.S. PATENT DOCUMENTS

| 5,027,466 A | * | 7/1991 | Crawford | ................ F16L 55/46 15/104.062 |
| 5,769,955 A | | 6/1998 | Kozisek | |
| 7,954,194 B2 | | 6/2011 | Hepburn | |
| 9,371,216 B2 | | 6/2016 | Olivier | |

FOREIGN PATENT DOCUMENTS

| CA | 2225880 A1 | 9/1999 |
| CA | 2516575 A1 | 2/2007 |
| JP | 06-332455 A | 12/1996 |
| JP | 2008-104897 A | 5/2008 |
| JP | 4557444 B2 | 10/2010 |

* cited by examiner

*Primary Examiner* — Mark Spisich
(74) *Attorney, Agent, or Firm* — Stites & Harbison, PLLC; David W. Nagle, Jr.

(57) ABSTRACT

An apparatus for retrieval of a pipeline pig from a discharge outlet of a pipeline includes a recovery tank with an upward-facing recovery opening, attached to an adjustable height support frame. The recovery tank is positioned below the discharge outlet, and the height of the support frame adjusted to hold the recovery opening of the tank as close as possible to the discharge outlet, to receive the pig and related fluid or solid discharge when the outlet is opened. Fluid and flowable solids recovered in the recovery tank can be evacuated from an extraction port. Multiple secondary environmental protections can optionally be used as well, including a secondary containment tray, side shields extending upwards from the recovery opening, or a cover to close the tank.

9 Claims, 3 Drawing Sheets

PIPELINE PIG RETRIEVAL APPARATUS

TECHNICAL FIELD

The present invention is in the field of pipeline servicing, including apparatus and methods for recovering pipeline pigs used in the cleaning of the interior of pipelines.

BACKGROUND

Pipelines are generally used to conduct gases or fluids from one location to another. Common examples include pipelines for carrying water, or refined and unrefined petroleum products such as bitumen, crude oil, refined oil and fuel products. From time to time it is necessary to perform various types of maintenance on pipelines to ensure that they are structurally sound and functioning within desired parameters.

One of these maintenance operations involves the periodic cleaning of the interior of the pipeline. A common method involves inserting a device known as a "pig" into the pipeline, and then using fluid or gas flowing through the pipeline to push the pig through the pipeline. As the pig moves through the pipeline, and depending on the type of pig used, contaminants like solids, etc., can be scrubbed from the pipeline, or simply to remove undesirable materials from the interior of the pipe. In other cases, pigs can be used to divide fluids transported within the pipeline.

Downstream from where the pig was inserted into the pipeline, it will be recovered. To recover a pig at the end of its travels down the pipeline typically involves opening the pipeline and removing the pig from the opened pipeline. Because the pig is removed by opening the pipeline, at the point of removal, there is potential for contents of the pipeline to spill out with the pig, creating the potential for environmental contamination in the area surrounding where the pig is being retrieved.

Environmental regulations are strict in terms of avoiding environmental contamination from pipeline discharge, so it is desirable to come up with alternative approaches to pig retrieval and recovery that eliminate environmental surface contamination etc.

If it were possible to create a device that would cost- and resource-efficiently allow for the recovery of pipeline pigs while minimizing environmental contamination it is believed that this would be commercially desirable.

SUMMARY OF THE INVENTION

As outlined above, the invention comprises a pig retrieval apparatus for use in the recovery of a pipeline pig from a pipeline having a pipeline outlet. The pipeline pig retrieval apparatus of the present invention achieves its objectives comprising a plurality of elements, including firstly a recovery tank. The recovery tank has an enclosed bottom with side walls extending upwards therefrom. The upper edges of the recovery tank define a recovery opening. The recovery opening is capable of receiving a pipeline pig along with pipeline discharged fluid and other material from the discharge outlet when positioned thereunder. The recovery tank includes an extraction port, which can be opened to permit the flow or extraction of pipeline discharged fluid or small solids from the recovery tank.

The recovery tank in certain embodiments also includes at least one side shield attached to an upper edge of a sidewall of the recovery tank, which side shield extends upwards from the upper edge of the related side wall and which will limit the environmental discharge of pipeline discharge fluid or other material outside of the recovery tank, in wind or other elements. In certain embodiments of the pig retrieval apparatus of the present invention the at least one side shield could be removable from the upper walls of the recovery tank. Certain embodiments of the pig retrieval apparatus might also include at least one side shield which is capable of being folded down to the outside of its related side wall of the recovery tank, to maximize operator access to the tank as required. It will be understood to those skilled in the art that many types of side shields could be conceived which would achieve the objective of protection from overspray over the upper edges of the recovery tank and all are contemplated within the scope of present invention.

The recovery tank could have many different shapes of horizontal cross-section. It is specifically contemplated that in many embodiments the horizontal cross-section of the recovery tank will be rectangular or square in shape, but any number of different shapes will be understood to be within the scope of the present invention, with attendant modifications to any side shields and other components to accommodate same.

The recovery tank is attached to an height-adjustable support frame which allows for the height-adjustable positioning of the recovery opening of the recovery tank in relation to the discharge outlet.

In use of the pipeline pig retrieval apparatus of the present invention, the recovery tank can be positioned below and in close proximity to the discharge outlet, by positioning the support frame and adjusting the height of the support frame. On opening of the discharge outlet, the recovery tank can then receive a pipeline pig discharge from the pipeline, along with any pipeline discharged fluid or other discharge solids.

Certain embodiments of the apparatus of the present invention would also include a removable cover for attachment in relation to the upper opening of the recovery tank which can protect the interior of the recovery tank and any pig or fluid or solids captured therein from the elements as well as protecting from any spillage thereof.

Certain embodiments of the pig retrieval apparatus of the present invention might also include a support grate positioned within the recovery tank, to support a received pipeline pig and any solids of a size larger than apertures in the support grate above the bottom of the recovery tank.

Further embodiments of the pig retrieval apparatus of the present invention might also include a secondary containment tray, within which the support frame is positioned on the ground surface below the discharge outlet, to protect the ground surface from any overspill or accidental discharge from the recovery tank, the extraction port or the like.

The support frame in most embodiments comprises a plurality of independently adjustable support legs which could be independently adjusted to allow for the accommodation of an uneven surface below the discharge outlet. In other cases, the support frame has only a single adjustment. Both such approaches are contemplated within the scope of the present invention.

In operation, the pig retrieval apparatus would be positioned, via the adjustable support frame, below the discharge outlet of the pipeline. The height of the support frame could be adjusted to properly position the recovery tank and the recovery opening of the recovery tank in as close proximity as practicable to the discharge outlet. The discharge outlet could then at the appropriate time be opened and, using pressure or conventional pipeline operations techniques, the pipeline pig could be discharged from the outlet into the recovery tank. In addition to the pipeline pig which could be discharged, the recovery tank would be of sufficient volume and shape to capture any pipeline discharged fluid or other discharged solids which might be discharged from the pipeline along with the pig. The side shields and the depth of the side walls of the recovery tank would protect the environment around the pipeline and the ground there under from errant discharge of fluids or solids into the environment or onto the ground.

DESCRIPTION OF THE DRAWINGS

While the invention is claimed in the concluding portions hereof, preferred embodiments are provided in the accompanying detailed description which may be best understood with the diagrams where like parts in each of the several diagrams are labeled with like numerals, and where:

DETAILED DESCRIPTION OF THE ILLUSTRATED EMBODIMENTS

This discussion provides examples of embodiments of the inventive subject matter. Although each embodiment represents a single combination of inventive elements, the inventive subject matter is considered to include all possible combinations of the disclosed elements. Those of skill in the art will recognize that the described embodiments are examples of possible configurations of the invention, and are not intended to be limiting to the scope of the invention. The drawings and descriptions contained herein are to be regarded as illustrative of the invention as set forth in the accompanying claims.

Figure 1:
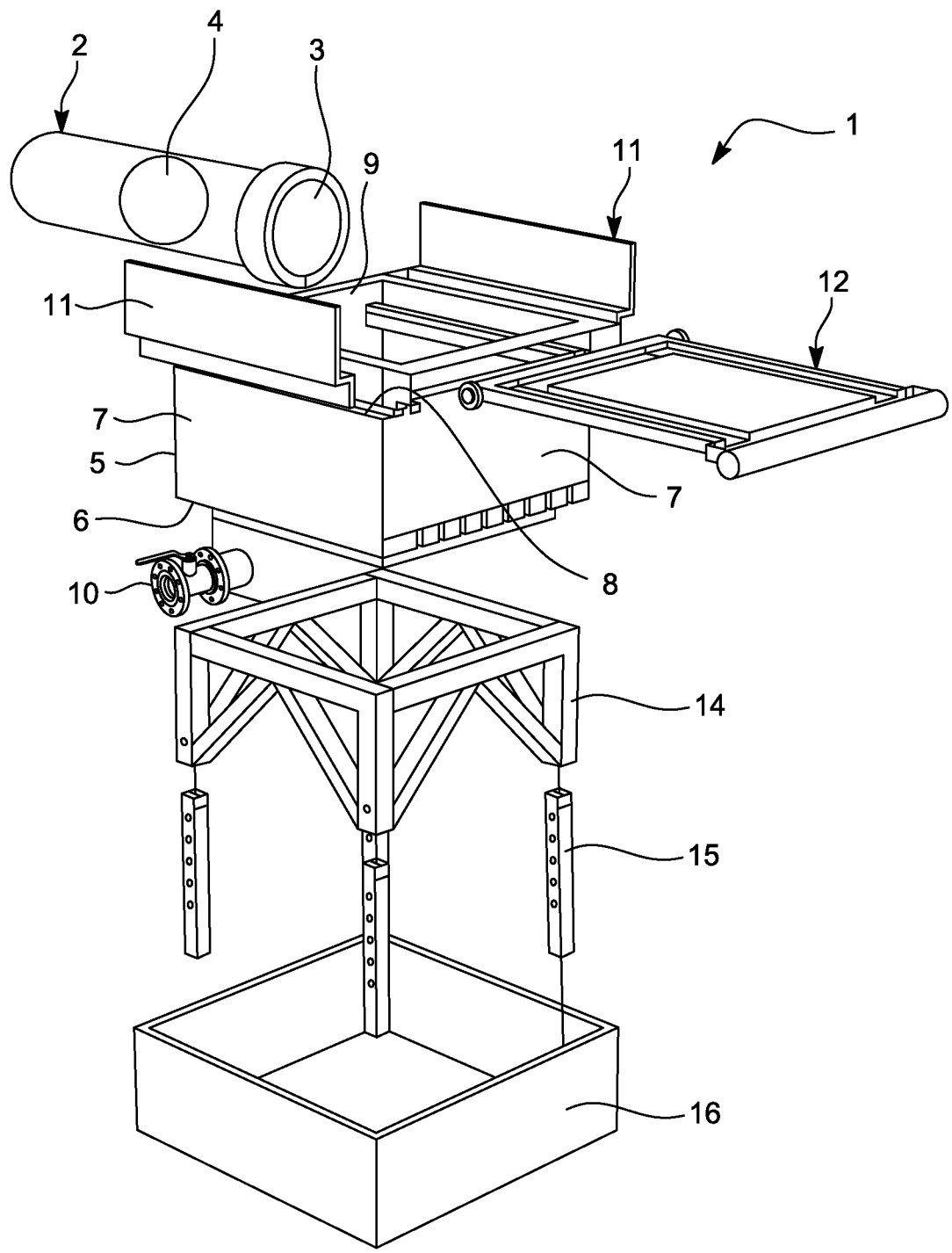
FIG. 1 shows a perspective view of one embodiment of a pipeline pig retrieval apparatus according to the present disclosure, showing a pipeline pig in dotted relief within the pipeline at the discharge outlet.
Figure 2:
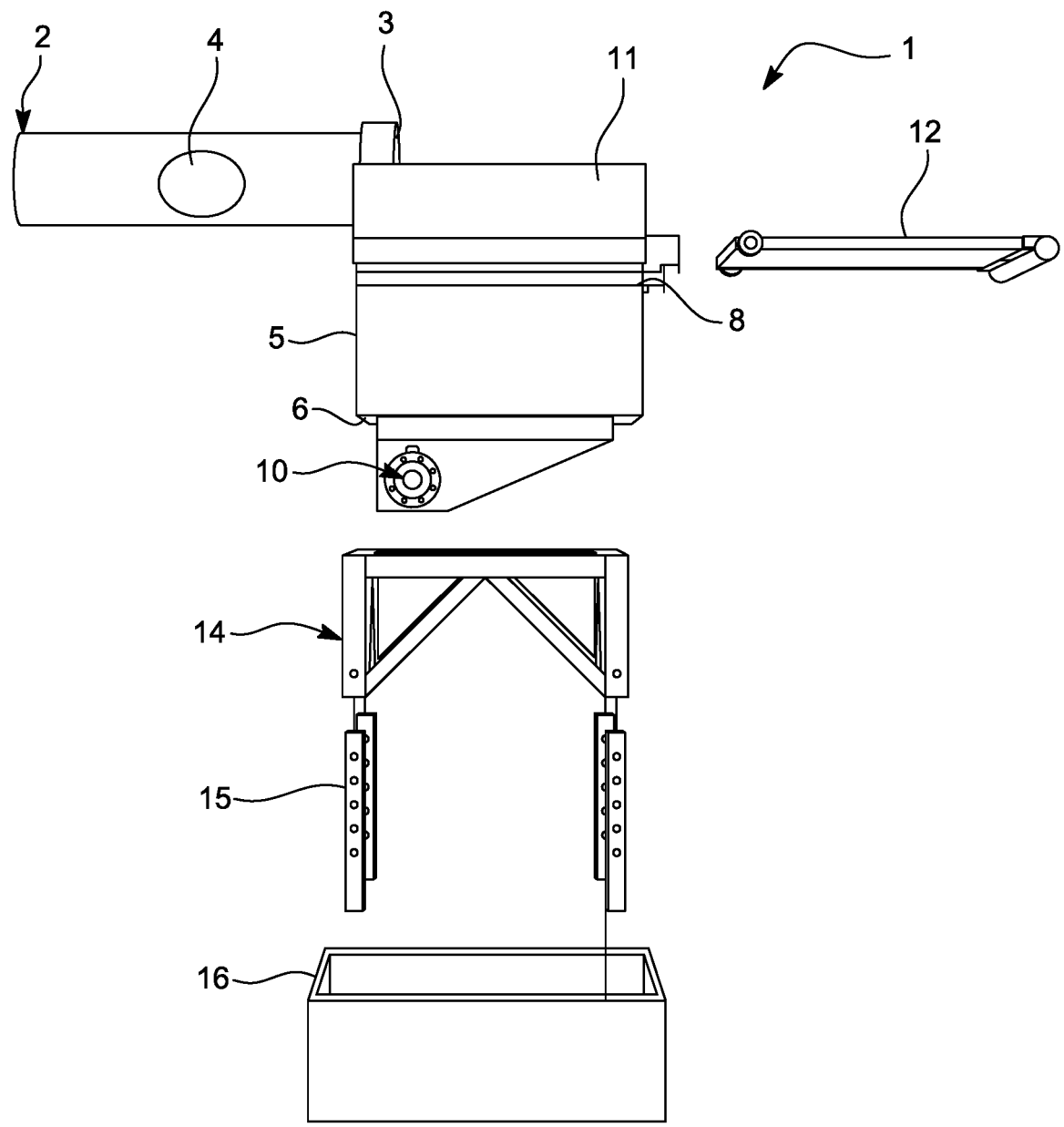
FIG. 2 shows a side view of the pipeline pig retrieval apparatus of FIG. 1.
Figure 3:
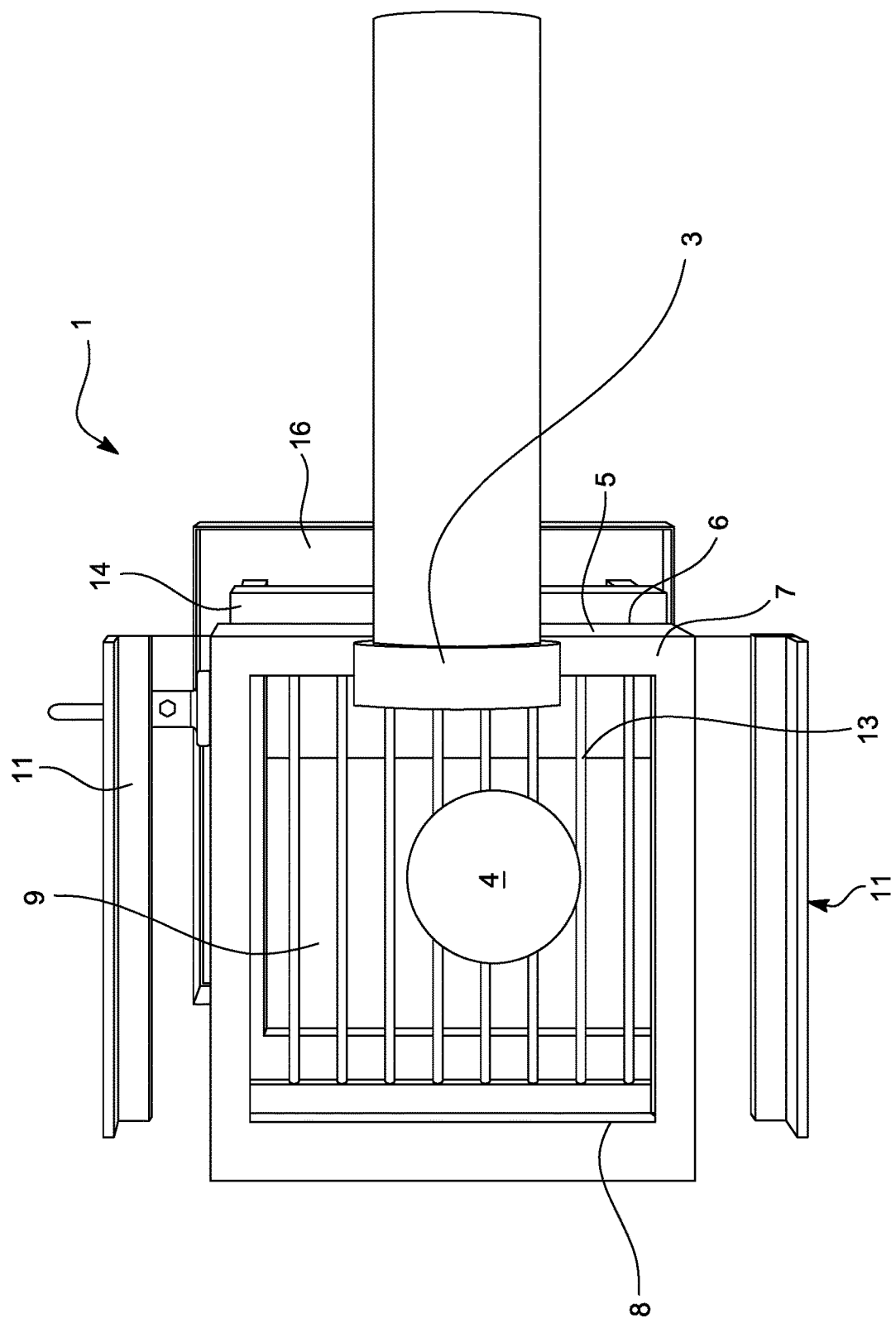
FIG. 3 shows a top view of the pipeline pig retrieval apparatus of FIG. 1, with the pipeline pig having been discharged shown in relief within the recovery tank.

FIGS. 1-3 demonstrate one embodiment of the pipeline pig retrieval apparatus 1 in accordance with the present invention. As discussed above, pipeline pigs are employed in maintenance operations, primarily in the cleaning of the interior volume of a pipeline. The present invention provides an apparatus 1 for retrieval of a pig from a pipeline 2 having a discharge outlet 3. The pig itself 4 is a cleaning or product segregation device used within the pipeline 2. Once in the pipeline 2, the pig 4 is moved by pipe pressure or otherwise down the interior of the pipeline conduit, cleaning the interior thereof as it moves or otherwise being used to segregate products therein or the like. A discharge outlet 3 is built into the pipeline 2 to allow for discharge (or in other cases insertion) of the pig 4 into the pipeline 2.

The apparatus is designed to significantly reduce the risk of environmental contamination during pig retrieval. This is especially important in the case where maintenance is being conducted on pipelines that carry materials that can be harmful to the environment. The invention described herein is not limited to the type of pipeline or the materials it carries, but is readily adaptable for use in any pipeline maintenance operation that involves the use of a pig.

The apparatus 1 of the present invention is used in conjunction with the discharge outlet 3 of the pipeline 2 to capture the pig 4 as it is discharged therefrom. The outlet 3 can be opened at the appropriate time to permit entry or egress of the pig 4 from the pipeline 2. When the outlet 3 is opened, the pipeline 2 might contain a small quantity of fluid or solids which is discharged along with the pig 4, and which it is desired to capture rather than allowing it to fall onto the ground or into environment causing contamination.

As shown in FIGS. 1-3, the apparatus 1 includes a recovery tank 5. The tank 5 comprises an enclosed bottom 6, with side walls 7 extending upward therefrom to define a tank volume. The side walls 7 extend upward to upper edges 8 thereof which define a recovery opening 9 of the recovery tank 5. The recovery opening 9 will be of sufficient size to catch or receive the pipeline pig 4 as discharged from the discharge outlet 3, and the volume of the tank 5 will be sufficient to hold the volume of pipeline-discharged fluids or solids which would typically be disgorged from the discharge outlet 3.

The recovery tank 5 could have many different shapes of horizontal cross-section. It is specifically contemplated that in many embodiments the horizontal cross-section of the recovery tank 5 and the shape of the recovery opening 9 thereof will be rectangular or square in shape, but any number of different shapes will be understood to be within the scope of the present invention.

Situated near the bottom, or at a location on the bottom of the recovery tank 5, is an extraction port 10, the extraction port 10 designed to provide a means of extracting the flowable contents of the recovery tank 5 in a controlled fashion. For example, pipeline-discharged fluids that are caught in the recovery tank 5 when the outlet 3 is opened, to recover a pipeline pig 4, can be removed to a separate holding container through the extraction port 10, for example by pumping from the recovery tank 5 through a hose or pipe into another holding tank. In some cases, the extraction port 10 will also include a valve so that the extraction port 10 can be closed or opened as desired. In some cases, the recovery tank 5 may have a canted, or sloped, bottom to assist in directing the contents of the recovery tank 5 to the location of the extraction port 10.

The recovery tank 5 can include additional features to reduce or eliminate contamination either of the contents of the recovery tank, or the surrounding environment. For example, in the embodiment of FIG. 1 there are shown a plurality of deployable side shields 11 that can be used to shield the recovery opening 9 of the tank 5 from exposure to wind, which might otherwise cause dispersal of material exiting the discharge outlet 3. The number of side shields 11 is at least one, and two side shields 11 are shown in FIG. 1, oriented approximately parallel to the axial flow of pipeline-discharged fluid or solids from the discharge outlet 3. The side shields 11 can be fashioned from any suitable material such as rubber, plastic, metal and the like. In some cases, the side shields 11 will be mounted such that the degree to which a shield extends above the plane of the recovery opening 9 of the recovery tank 5 or the plane of the upper edge of the discharge outlet 3 can be adjusted. The side shields 11could be retractable or foldable down outside of the side walls 7 of the recovery tank 5 to maximize operator access, or could be permanently or removably rigidly attached—all such approaches will be understood to be within the scope of the present invention.

The recovery tank 5 may also include, as shown in the illustrated embodiments, a cover 12 that can be used to cover the top of the tank 5 when it is not in use, or after use. In either case, the cover 12 is effective to prevent extraneous materials such as rain and snow from getting into the recovery tank 5 and either contaminating the contents, or causing overflow of the tank 5, which would otherwise result of overflow of the tank 5 and contamination of the surrounding environment. The cover 12 would be removed from the recovery tank 5 when the discharge outlet 3 was to be opened and a pig and related fluids or solids received into the recovery tank 5. The cover 12 could be removable, or in other embodiments might be hingably or slideably attached—all such approaches will again be understood to those skilled in the art and are contemplated within the scope of the present invention.

In certain embodiments such as demonstrated in FIG. 3, the recovery tank 5 may also include a support grate 13 located within the tank 5, the support grate 13 effective to catch and support objects greater than the gap size of the support grate 13, for example, the pig 4, or large accumulations of solid or semi-solid materials that one wishes to prevent from falling into the tank. This improves the ease of retrieving the pig 4, rather than having to extract it from the bottom of the tank 5. Also, in cases where there are accumulations of solids, the support grate 13 provides a way to at least partially separate solid and fluid components that come out of the pipeline 2 during the pig retrieval process.

The recovery tank 5 is attached to a height-adjustable support frame 14. The support frame 14 as shown comprises a plurality of adjustable length legs 15, which support the tank 5 and allow for the adjustment of the vertical height or positioning of the recovery tank 5 in relation to the discharge outlet 3. For example, in most cases, it would be desirable to position the recovery tank 5 as close as possible below the discharge outlet 3 to minimize splashing or spillage of discharged fluids and solids during a pig recovery operation, again reducing the risk of inadvertent release of pipeline contents into the surrounding environment. The legs 15 of the frame 14 could be linked such that the height of all of the legs 15 could be adjusted in unison, or in other embodiments, the legs 15 might be independently adjustable to allow for independent action and levelling of the recovery tank 5 in relation to the discharge outlet and an uneven ground surface. Both such approaches are contemplated within the scope of the present invention.

The embodiment of the apparatus 1 shown in FIGS. 1-3 also includes a secondary containment tray 16 that will contain the contents of the recovery tank 5 should a failure of the recovery tank 5 occur, or leakage from the extraction port 10 occur, etc.

Other features can include a means of electrically grounding the recovery tank. This will be especially important in situations where the pipeline contents are potentially flammable.

In operation, the apparatus 1 will be placed on a ground surface beneath and in proximity to the discharge outlet 3 of a pipeline 2 from which it is desired to recover a pipeline pig 4. The height-adjustable support frame 14 can be adjusted in positioning the apparatus 1 so that the recovery opening 9 of the tank 5 is held in position near the discharge outlet 3 as near as practicable thereto. At this point, should conditions require, side shields 11 can be attached or deployed to shield the discharge outlet 3 and the recovery tank 5 from the wind or environment.

Any cover 12 can be removed from the recovery opening 9 to allow discharge contents of the pipeline 2 and the pig 4 to be disgorged into the recovery tank 5. The operator will confirm that the extraction port 10 is closed, or that a line to a separate holding tank is installed and sealed. The discharge outlet 3 can then be opened to allow the contents and the pig 4 to fall into the recovery tank 5. Once the pig 4 is received in the tank 5, the discharge outlet 3 can be closed.

Once the pig 4 has been extracted to the recovery tank 5, the pipeline-discharged fluids from the recovery tank 5 can be removed by pumping out of the tank 5 via the extraction port 10. Alternatively, a cover 12 may be put in place and the contents of the recovery tank 5, including the pig 4, removed later.

The apparatus 1 is easily moveable between various pipelines 2 and outlet 3 locations, to allow for quick and efficient use in various maintenance operations.

The specific materials used in constructing the components of the system described herein, are not considered limiting to the scope of the invention. Those of skill in the art will readily recognize and be able to select materials and components that will accomplish the objectives of the invention.

It should also be apparent to those skilled in the art that many more modifications besides those already described are possible without departing from the inventive concepts herein. The inventive subject matter, therefore, is not to be restricted except in the scope of the appended claims. In interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps not expressly referenced.

The invention claimed is:

1. A pig retrieval apparatus for use in the recovery of a pipeline pig from a pipeline having a discharge outlet, the apparatus comprising:
   a. a recovery tank having an enclosed bottom with side walls extending upwards therefrom to a plurality of upper edges, defining a recovery opening capable of receiving pipeline-discharged fluid and other material from the discharge outlet when positioned thereunder;
   b. an extraction port in the recovery tank which will permit the flow of pipeline-discharged fluid or solids from the recovery tank; and
   c. an adjustable-height support frame attached to the recovery tank which can be positioned on the ground below the discharge outlet and allows for the adjustable height positioning of the recovery opening of the recovery tank in relation to the discharge outlet;
   wherein upon positioning of the recovery tank below and in close proximity to the discharge outlet and on opening of the discharge outlet, the recovery tank can receive the pipeline pig discharged from the discharge outlet along with any pipeline-discharged fluid or other discharged solids.

2. The pig retrieval apparatus of claim 1, and further comprising at least one side shield attached in proximity and in relation to an upper edge of a side wall and extending upwards from said upper edge, whereby said at least one side shield will limit the environmental discharge of pipeline-discharged fluid or other discharged solids outside of the recovery tank in wind or other elements.

3. The pig retrieval apparatus of claim 2, wherein the at least one side shield is removable.

4. The pig retrieval apparatus of claim 2, wherein the at least one side shield is permanently attached.

5. The pig retrieval apparatus of claim 2, wherein the at least one side shield is hingably attached to the upper edge of the corresponding side wall and is capable of being folded down to the outside of its related side wall of the recovery tank, to maximize operator access to the tank.

6. The pig retrieval apparatus of claim 1, and further comprising a removable cover for the recovery opening of the recovery tank which can, when in position on the recovery opening, protect the interior of the recovery tank and any contents therein from the elements.

7. The pig retrieval apparatus of claim 1, and further comprising a support grate positioned within the recovery tank to support a received pig and any solids of a size larger than apertures in the support grate above the bottom of the recovery tank.

8. The pig retrieval apparatus of claim 1, and further comprising a secondary containment tray within which the support frame is positioned on the ground surface below the discharge outlet, to protect the ground surface from any overspill or accidental discharge from the recovery tank.

9. The pig retrieval apparatus of claim 1, wherein the support frame comprises a plurality of individually adjustable legs, permitting the adaptive positioning of the recovery tank below a discharge outlet on an uneven ground surface.

\* \* \* \* \*